(12) United States Patent
Fürst

(10) Patent No.: US 8,991,545 B2
(45) Date of Patent: Mar. 31, 2015

(54) METHOD FOR DETERMINING THE WEIGHT OF AT LEAST ONE OCCUPANT OF A VEHICLE

(71) Applicant: Audi AG, Ingolstadt (DE)

(72) Inventor: Franz Fürst, Buxheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/722,024

(22) Filed: Dec. 20, 2012

(65) Prior Publication Data

US 2013/0161110 A1    Jun. 27, 2013

(30) Foreign Application Priority Data

Dec. 21, 2011   (DE) .......................... 10 2011 121 871

(51) Int. Cl.
*B60R 21/015* (2006.01)
*G01G 19/08* (2006.01)
*A47C 31/12* (2006.01)

(52) U.S. Cl.
CPC ............ *B60R 21/015* (2013.01); *A47C 31/126* (2013.01); *G01G 19/08* (2013.01); *B60G 2400/61* (2013.01)
USPC .............................. 180/290; 701/45; 702/174

(58) Field of Classification Search
CPC ..... G01G 19/086; G01G 19/08; G01G 19/10; G01G 19/12; G01G 19/02; G01G 19/03; B60R 21/015; B60R 2021/01516; B60R 2021/01512; B60W 40/13; B60G 2400/61; B60G 2400/62; B60G 2400/60

USPC ............ 280/735, 728.1, 801.1, 748; 180/273, 180/268, 271, 290; 701/45, 46; 702/174, 702/175; 340/667, 666
See application file for complete search history.

(56) References Cited

U.S. PATENT DOCUMENTS

| | | | |
|---|---|---|---|
| 5,973,273 A * | 10/1999 | Tal et al. ........................... 177/1 |
| 6,206,452 B1 * | 3/2001 | Talbot ........................ 296/146.1 |
| 6,250,671 B1 | 6/2001 | Osmer et al. |
| 6,536,797 B1 | 3/2003 | Reich |
| 6,557,424 B1 | 5/2003 | Morell |
| 6,578,870 B2 | 6/2003 | Winkler et al. |
| 6,808,200 B2 | 10/2004 | Drobny et al. |
| 7,281,418 B2 * | 10/2007 | Mardirossian ............... 73/65.05 |
| 7,788,063 B2 * | 8/2010 | Bodin et al. ................... 702/173 |
| 2006/0108154 A1 | 5/2006 | Mack et al. |
| 2006/0124364 A1 * | 6/2006 | Loewen et al. ................. 177/45 |
| 2009/0151477 A1 | 6/2009 | Hwang et al. |

(Continued)

FOREIGN PATENT DOCUMENTS

| | | |
|---|---|---|
| CN | 1341206 | 3/2002 |
| CN | 101462526 | 6/2009 |

(Continued)

*Primary Examiner* — Keith Frisby
(74) *Attorney, Agent, or Firm* — Henry M. Feiereisen LLC

(57) ABSTRACT

A method for detecting a weight of at least one occupant of a motor vehicle includes the steps of detecting a first load which acts on a chassis of the motor vehicle as first weight value at a time point prior to entering of the at least one occupant into the motor vehicle, detecting a second load which acts on the chassis as second weight value at a second time point after entering of the at least one occupant into the motor vehicle; and determining the weight of the at least one occupant by forming a difference between the first and second weight values.

9 Claims, 2 Drawing Sheets

(56) References Cited

U.S. PATENT DOCUMENTS

| | | | |
|---|---|---|---|
| 2011/0093239 A1* | 4/2011 | Holbrook et al. | 702/174 |
| 2011/0178673 A1* | 7/2011 | Nakamura et al. | 701/29 |
| 2011/0267186 A1 | 11/2011 | Rao et al. | |

FOREIGN PATENT DOCUMENTS

| | | |
|---|---|---|
| CN | 102233858 | 11/2011 |
| DE | 197 41 451 | 3/1999 |
| DE | 197 54 166 | 6/1999 |
| DE | 100 09 540 | 9/2001 |
| DE | 100 47 193 C2 | 2/2003 |
| DE | 102 43 516 A1 | 4/2004 |
| DE | 102 49 440 A1 | 5/2004 |
| DE | 601 03 060 T2 | 4/2005 |
| DE | 600 19 135 T2 | 2/2006 |
| DE | 600 17 912 T2 | 4/2006 |
| DE | 600 04 536 T2 | 6/2006 |

* cited by examiner

METHOD FOR DETERMINING THE WEIGHT OF AT LEAST ONE OCCUPANT OF A VEHICLE

CROSS-REFERENCES TO RELATED APPLICATIONS

This application claims the priority of German Patent Application, Serial No. 10 2011 121 871.1, filed Dec. 21, 2011, pursuant to 35 U.S.C. 119(a)-(d), the disclosure of which is incorporated herein by reference.

BACKGROUND OF THE INVENTION

The present invention relates to a method for determining the weight of at least one passenger of a motor vehicle with a vehicle body which is built on and rests on a chassis.

The following discussion of related art is provided to assist the reader in understanding the advantages of the invention, and is not to be construed as an admission that this related art is prior art to this invention.

From the state of the art motor vehicles with reversible and/or irreversible occupant protection means are known. Reversible occupant protection means are for example configured as seat belt tensioners, which are activated in case of an impending collision of the motor vehicle, in order to prevent a dangerous forward inclination of a vehicle occupant. Irreversible occupant protection means are typically triggered pyrotechnically and can in particular include airbags. For triggering the occupant protection means, occupant protection systems are disclosed in the state of the art which correspondingly activate the occupant protection means immediately when an impending collision risk is recognized.

It would be desirable and advantageous to provide an improved method for determining the weight of the at least one occupant of the motor vehicle, which can be implemented in the motor vehicle particularly cost effectively.

SUMMARY OF THE INVENTION

According to one aspect of the present invention, a method for detecting a weight of at least one occupant of a motor vehicle, includes the steps of detecting a first load which acts on a chassis of the motor vehicle as first weight value at a time point prior to entering of the at least one occupant into the motor vehicle, detecting a second load which acts on the chassis as second weight value at a second time point after entering of the at least one occupant into the motor vehicle and determining the weight of the at least one occupant by forming a difference between the first and second weight values.

The load acting on the chassis is caused by the weight of the vehicle body, which includes the entire superstructure of the vehicle, a possible payload of the motor vehicle and the sum of the weights of the occupants.

The method according to the invention avoids the arrangement of expensive weight sensor in the vehicle seats. Further, the occupant weight determined by way of the method is more accurate because disruptive effects resulting from the fact that the occupant when occupying the seat also always supports himself at other sites for example with his feat, are avoided.

According to another advantageous feature of the present invention, the load acting on the chassis is continuously detected by means of at least one sensor. When the continuously detected weight value changes within predeterminable time intervals sufficiently quickly, this thus detected change is associated with the entering of the at least one occupant. For example the detected change of the weight value within the time interval can be sufficiently great and fast so that a refueling of the motor vehicle is not erroneously determined to be an entering of the at least one occupant.

When continuously detecting the weight value, the first weight value is also detected at the first time point and the second weight value is also detected at the second time point. Correspondingly, the first time point is associated with the time period prior to the detected change of the weight value and the second time point is associated with the time period after the detected change. Subsequently, the second weight value is associated with the weight of the entered occupant.

According to another advantageous feature of the present invention, further sensors are provided which are used to detect an entering of the at least one occupant and with this the first and second time points.

According to another advantageous feature of the present invention, the first time point is defined in that the motor vehicle changes from a closed state into an at least partially opened state. The closed state of the motor vehicle is defined in that all vehicle doors, as the case may be with the exception of the rear hatch or rear door, are closed. Such a state is for example detectable by means of further sensors which are configured as door contact sensors. As an alternative or in addition, the state of at least one of the locking means which is assigned to the respective vehicle door is verified. The unlocking of the vehicle door which is associated with the release of the vehicle door is associated with an immediately impending entering of the at least one vehicle occupant and the first weight value is determined.

The second time point is preferably defined in that the motor vehicle changes from the at least partially opened state back into the closed state. In this case, the state of the locking means which is assigned to the vehicle door can also be verified. In particular in motor vehicles which have an automatic door locking system which automatically actuates a locking automatic after the motor vehicle starts driving, the second time point can be associated with the relocking of the vehicle door.

According to another advantageous feature of the present invention, the second time point is defined by the actuation of an ignition of the motor vehicle or by starting of the motor vehicle.

In motor vehicles with central locking system, the state of the at least one vehicle door is verified by way of the operating state of a central control device for the central locking system.

When multiple vehicle occupants enter the motor vehicle simultaneously, a determination of the individual occupant weights can be problematic. Therefore, it is provided to determine or at least estimate a weight distribution of occupant weights in the vehicle interior by means of plausibility assumptions. Advantageously, a seat occupation is detected inside the vehicle. For this, all vehicle seats are provided with corresponding seat occupation sensors, which allow detecting whether an occupant occupies the respective vehicle seat. The seat occupation sensors can for example be configured as simple switches, belt fastening sensors or capacitive sensors. As an alternative or in addition, the seat occupation can be detected by means of an optical detection unit such as in particular a camera. This has the advantage that plausibility assumptions relating to the respective occupant weight can be carried out by way of a corresponding imaging by way of the optically detected data. For example when it is optically detected that an adult male occupies a driver seat and a child occupies a rear seat, the male driver is generally assigned an occupant weight which for example corresponds to $2/3$ of the difference of the first and second weight values. In a further exemplary embodiment, the image recognition and the imaging are configured so that by way of the respective optical appearance of the occupant the associated weight of the occupants is estimated. The determined difference between the first and second weight value is correspondingly associated to the individual weight proportions of the present vehicle occupants.

By means of the sensors, the weight of the vehicle body of the motor vehicle can be detected. The sensors are arranged between the chassis of the motor vehicle and the body of the vehicle in particular in the region of the wheel suspension. This allows detecting dynamic loads acting on the vehicle body during the drive. The dynamic loads determine the vibration behavior of the vehicle body relative to the chassis, wherein the occurring dynamic loads can be analyzed for determining the weight distribution inside the passenger compartment. In particular, the occurring vibration modes can be analyzed.

According to another advantageous feature of the present invention, driving parameter values and/or occupant related parameter values which were previously stored vehicle-side are taken into account, in particular for determining the plausibility assumptions. As driving parameter values, in particular the dynamic loads can be used which have occurred during a previous drive of the motor vehicle. Correspondingly, occupant weights which were determined during a previous drive can in particular be used as occupant related parameter values. By comparing the previously detected driving parameter values and/or the previously detected occupant related parameter values to the corresponding actual values, the analysis for determining the weight distribution can be facilitated. For example, a previously determined occupant weight of the driver can initially be assigned to the driver seat, in particular when the previously detected data suggest that the motor vehicle is mostly driven by the same driver. This reduces the number of the free parameters when determining the weight distribution so that the distribution of the occupant weights on the individual vehicle seats can be associated quickly with these plausibility assumptions. By means of the analysis of the actually detected dynamic loads it is then verified whether the assigned weight distribution is consistent. If needed, the weight distribution is then adjusted until the occurring dynamic loads are consistent with the determined weight distribution.

At least one occupant protection means of the motor vehicle is controlled in as a function of the determined occupant weights. The occupant protection means can either be reversible or irreversible and in particular be configured as airbag or seat belt tensioner. The occupant protection means which is assigned to the driver seat or to the vehicle seat has a triggering characteristic which is adjusted in dependence on the weight of the vehicle occupants occupying the driver seat or the vehicle seat. For example the filling amount or the speed with which the gas flows into the airbag is decreased when the vehicle occupant sitting on the driver seat is particularly light weight. Correspondingly, in this case a return force of the seat belt tensioner which is assigned to the driver seat can also be decreased. This allows minimizing the risk of injury of the vehicle occupants when the occupant safety means is triggered.

According to another aspect of the present invention a motor vehicle which includes the vehicle body which is constructed on the chassis and a device for determining the weight of the at least one vehicle occupant. The device for determining the weight of the at least one occupant is configured for carrying out the method according to the invention. The device includes the at least one sensor for determining the load acting on the chassis, which sensor is operatively connected to an analysis unit for determining the weight of the at least one vehicle occupant. The previous remarks with regard to the method also apply to the motor vehicle and the device for determining the weight of the occupants. The sensor is arranged in the region of the wheel suspension on a damping unit in particular a shock absorber, so that a suspension travel of the vehicle body can be detected. This enables detecting static loads and the dynamic loads occurring during the drive.

According to another advantageous feature of the present invention, at least one further sensor is provided for detecting the entering of the at least one vehicle occupant. With this, in particular the first and/or the second time point for determining the first and/or second weight value can be detected.

According to another advantageous feature of the present invention, at least one of the further sensors is configured as electromagnetic detection device, in particular as infrared or radio receiver, which has a detection range which corresponds to the immediate vicinity of the motor vehicle. For example, the thus configured further sensor is part of the central locking system of the motor vehicle. By means of the sensor, a signal of a portable control unit which is provided for controlling access can be detected. The actuation of the portable control unit is linked with the release of the at least one locking means of the motor vehicle and with this with the immediately impending entering of the at least one vehicle occupant. The first time point is linked with the actuation of the portable control unit.

According to another advantageous feature of the present invention, the electromagnetic detection device is configured to detect the presence of a portable identification unit which can in particular be integrated in a key chain as passive transponder, for determining the first and/or second time point in the detection range. For example, the first time point can automatically be determined when the occupant approaches the motor vehicle and with this the method for determining the weight of the occupants can be automatically initiated. When the presence of the portable identification unit is detected in the interior of the vehicle, the second time point is determined.

According to another advantageous feature of the present invention, at least one of the further sensors for detecting the first and/or second time point can be configured so that an open state of at least one of the vehicle doors and/or a state of the at least one locking means which is assigned to the vehicle door can be verified. Correspondingly, the further sensor is detectable as door contact sensor or as door locking sensor. Thus, in particular the number of the vehicle doors which open and close when the occupants enter can be determined so that at least plausibility assumptions regarding the number of the entered occupants can be made. This information can in particular be used for determining the weight distribution to the individual vehicle seats or the vehicle places, so that by way of the detected change of the weight value individual occupant weights can be determined.

According to another advantageous feature of the present invention, at least one of the further sensors can be configured as optical detection device, in particular as a camera. The optical detection device detects the vehicle interior so that the entering of the occupants can be determined. Preferably, by way of the optical detection device it is determinable which vehicle seats or which vehicle seating places are occupied in the vehicle interior by occupants. Correspondingly, the size of the individual vehicle occupants is determinable by means of the optical data, as the case may be by using a correspondingly configured image detection, which allows drawing plausible conclusions about the weights of the occupants. In particular, miss-assignments of occupant weights which are the result of a piece of luggage erroneously present on the vehicle seat can be avoided by means of the optical detection device.

For accurately determining the weight distribution, seat occupation sensors are provided in the vehicle seats or the vehicle places for detecting the seat occupation in the motor vehicle. The analysis of the data produced by the seat occupation sensors facilitates in particular the determination of the weight distribution in the vehicle interior, when for example multiple vehicle occupants have entered the motor vehicle simultaneously.

The sensors which are provided for detecting the first and second weight values, are preferably arranged at all wheel suspensions of the motor vehicle so that the dynamic loads acting on the vehicle body can be precisely and accurately detected. The sensors measure for example the suspension travel so that the vibration behavior of the vehicle body can be precisely determined. The at least one sensor is connected with an analysis unit which is configured to carry out to analyze the vibration behavior of the vehicle body in particular with regard to the occurring vibration modes. This enables determining the weight distribution in the vehicle interior, in particular the seat occupation and the individual occupant weights.

For simplifying the analysis of the dynamic loads, the analysis unit is connected with a memory unit on which the driving parameters and/or the occupant related parameter values are storable. This achieves that in particular a value which was determined in a previous drive for the occupant weight and/or at least one value detected during the previous drive for the dynamic load is stored. This enables plausible assumptions with regard to possible weight distributions which facilitates the analysis of the actually detected sensor data for determining the occupant weight in particular for determining the weight distribution.

The analysis unit is connected with at least one control unit of the reversible or irreversible occupant protection means. Preferably, the analysis unit is connected with all control units of the occupant protection means in the motor vehicle, so that the respective occupant protection means can be controlled in dependence on the assigned occupant weight. The weight dependent control of the occupant protection means decreases the risk of injury of vehicle occupants, which in particular exists when triggering the occupant protection means.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
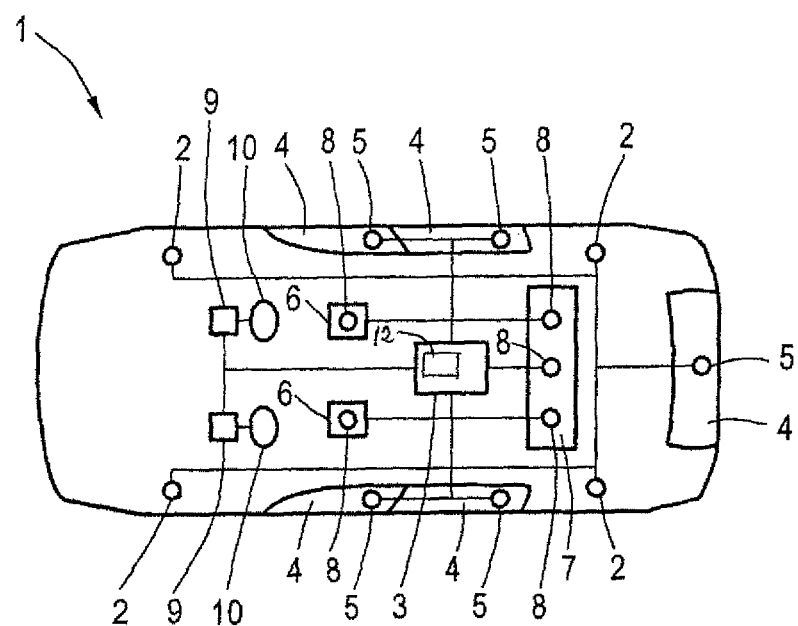
FIG. 1 shows a schematic plan view of a motor vehicle with a device for determining the weight of occupants according to a first exemplary embodiment.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic plan view of a motor vehicle 1. The motor vehicle 1 has a vehicle body and a chassis. A load which acts on the chassis is detected by means of sensors 2, which are arranged in the regions of the wheel suspensions between the chassis and the self supporting vehicle body.

The static load which acts on the vehicle body is defined by the weight of a vehicle superstructure, a payload and the sum of the occupant weights.

For determining the weight and the dynamic loads acting on the vehicle body during the drive, corresponding suspension travels of damping units of the motor vehicle which are configured as shock absorbers are detectable by means of the sensors 2. The sensors 2 are connected with an analysis unit 3 which is provided for the determination of an occupant weight. The motor vehicle 1 further has vehicle doors 4 which are provided with further sensors 5, which are configured as door contact sensors. By means of the door contact sensors, an opening state of the motor vehicle 1 is detectable. The further sensors 5 are operatively connected with the analysis unit 3 so that when opening one of the vehicle doors 4 a corresponding signal can be provided to the analysis unit 3 from the door contact sensor assigned to the vehicle door 4. Thus, at least plausible assumptions are possible with regard to the number of the entering occupants.

When the occupants enter the motor vehicle 1, the load acting on the chassis also changes, which load can be detected by means of the sensors 2, in order to determine the sum of the weights of the entering occupants. For determining the weight distribution inside an interior of the vehicle, vehicle seats 6 or seating or a rear seating bench 7 are provided with seat occupation sensors which in the here shown exemplary embodiment are configured as belt lock sensors of not further shown seat belt fastening sensors. By means of the data, which are provided by the sensors 2, the further sensors 5 and the seat occupation sensors 8, the individual weight of the occupant occupying the vehicle seat is determinable by the analysis unit 3. The thus determined occupant weight or the thus determined occupant weights can be provided to control units 9 of irreversible occupant protection means 10, which are here configured as pyrotechnically triggerable airbags. This enables the triggering of the irreversible occupant protection means 10 in dependence on the determined occupant weight.

Figure 2:
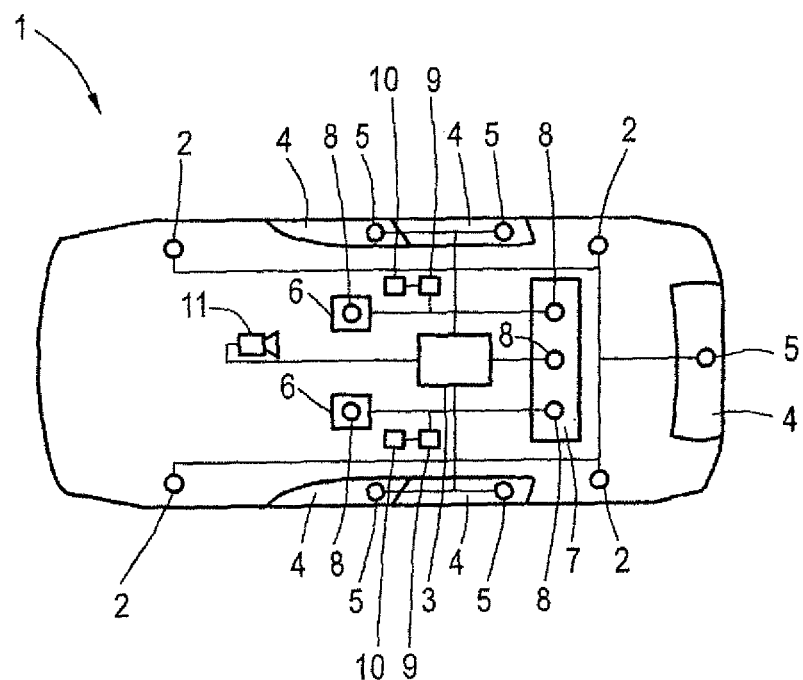
FIG. 2 shows a schematic plan view of the motor vehicle with a device for determining the weight of occupants according to a second exemplary embodiment.

FIG. 2 shows a second exemplary embodiment of the device for determining the occupant weight which essentially corresponds to the first exemplary embodiment already shown in FIG. 1. The second exemplary embodiment has a further sensor 5 which is configured as optical detection device 11 and detects the interior of the motor vehicle 1. The optical detection device 11 is connected with the analysis unit 3 which is configured for analyzing optical image data. For this, corresponding image recognition software is implemented in the analysis unit 3. By means of optically detected data, a size determination of the entering occupants is enabled which is taken into account when determining the occupant weight by means of the analysis unit 3.

The occupant protection means 10 of the second exemplary embodiment is configured as reversible seat belt tensioner. The seat belt tensioner is controllable in dependence on the determined occupant weight, so that excessive forces acting on the occupant can be avoided when triggering.

The seat occupation sensors 8 of the second exemplary embodiment are configured as capacitive sensors which are installed in the vehicle seats 6 or in the rear bench 7. By means of the capacitive sensors, a pressure acting on the seat surface of the vehicle seat 6 or the rear bench can be detected, so that the seat occupation in the motor vehicle is determinable.

Figure 3:
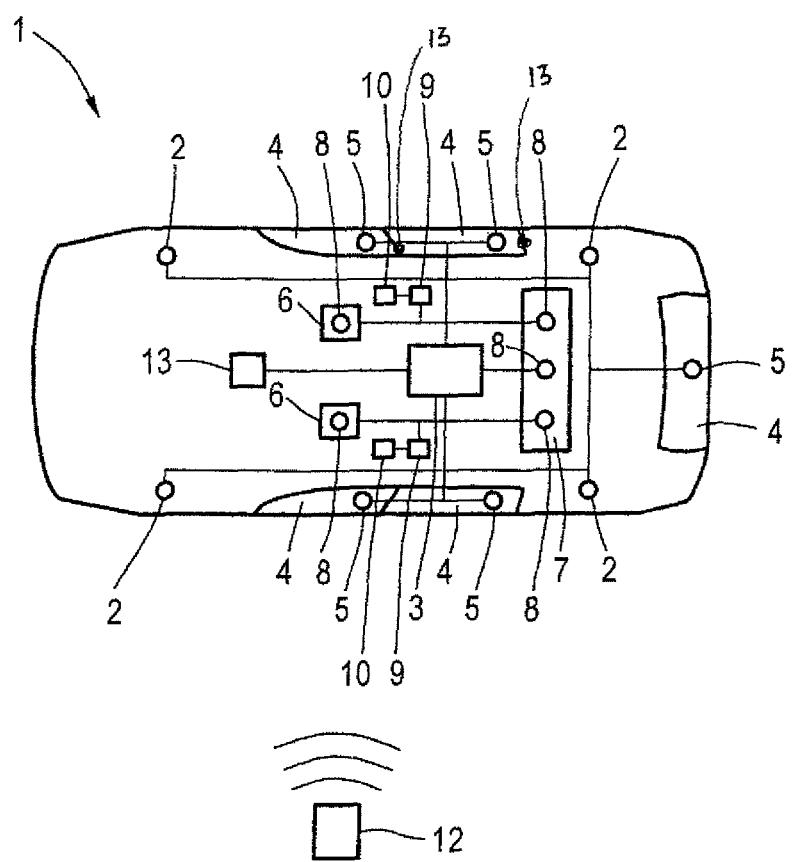
FIG. 3 shows a schematic plan view of the motor vehicle with a device for detecting the weight of occupants according to a third exemplary embodiment.

FIG. 3 shows a third exemplary embodiment of the invention in which essential components correspond to the one of the exemplary embodiments already described in the FIGS. 1 and 2.

In the third exemplary embodiment, an external and portable control unit 12 is provided which is configured for controlling access. By means of the control unit 12, a signal for unlocking the motor vehicle 1 can be detected when the user actuates the control unit 12. Locking means 13 are assigned to the vehicle doors, which locking means can be locked and unlocked by actuating the external control unit 12. One of the further sensors is configured or detecting the signal emitted by the control unit 12.

In a method for detecting the weight of occupants, the load acting on the chassis is determined as first weight value at a first time point and correspondingly at a second time point as second weight value. The first time point is determined such that it is prior to the entering of the occupant. The first time point is defined in that the motor vehicle changes from a closed state in which all vehicle doors are closed and locked into a partially open state in which at least one of the vehicle doors 4 is unlocked and open.

The second time point is correspondingly determined in that the motor vehicle 1 changes from the partially open state back into the closed state.

For determining the first and second time point, data which are provided by the further sensors are analyzed.

By means of the difference between the first weight value and the second weight value, the sum of the weights of the entered occupants is first determined. Then, each individual occupant weight is determined and assigned to the vehicle seats or the vehicle seating places. In particular, the signals which are provided by the seat occupation sensors 8 are analyzed. In addition, driving parameters and person specific parameters are analyzed for the analysis which were determined in a previous drive and are stored on a memory unit 12 of the analysis unit 3. These drive parameters or person specific parameter values provide plausible assumptions with regard to the weight distribution in the interior of the vehicle. In particular, the values for the drive parameters characterize the vibration behavior or the dynamic loads typically occurring during the drive.

The dynamic loads are detected during the drive by means of the sensors 2 and analyzed with regard to the weight distribution. This occurs by way of the analysis of the occurring vibrations of the vehicle body by taking the stored drive parameters and person specific parameters into account.

In exemplary embodiments, in which an optical detection unit 11 is provided a size determination of the entering occupants is carried out by means of an image recognition. From this, additional plausible assumptions are derived with regard to the individual occupant weights, which are taken into account when determining the weight distribution.

Of course, the here described embodiments are only exemplary and are not limiting. In particular, the components which are provided for determining the entering process of the occupants, which are in particular shown in FIGS. 1 to 3, can be combined in other useful ways.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor vehicle, comprising:
   a chassis;
   a vehicle body constructed on the chassis and resting on the chassis;
   at least one sensor for detecting a first load which acts on the chassis as a first weight value at a first time point prior to entering of at least one occupant into the motor vehicle and for detecting a second load which acts on the chassis as a second weight value at a second time point after entering of the at least one occupant into the motor vehicle, wherein the at least one sensor is constructed for detecting a dynamic load acting on the vehicle body during a drive of the motor vehicle said dynamic load defining a vibration behavior of the vehicle body; and
   an analysis unit operatively connected with the at least one sensor, for determining the weight of the at least one occupant as a difference between the first and second weight values, wherein the analysis unit is configured for determining a distribution of the weight of the at least one occupant in the motor vehicle as a function of the vibration behavior of the vehicle body.

2. The motor vehicle of claim 1, further comprising at least one further sensor for detecting the entering of the at least one occupant into the motor vehicle.

3. The motor vehicle of claim 2, further comprising multiple of said at least one further sensor, wherein at least one of the multiple sensors has a detection range which corresponds to a vicinity of the motor vehicle and is constructed for detecting a signal of a portable control unit or the presence of a portable identification unit within the detection range, for determining at least one of the first and the second time point.

4. The motor vehicle of claim 2, further comprising multiple of said at least one further sensor, wherein at least one of the multiple sensors is constructed for verifying at least one of an opening state of at least one door of the motor vehicle and a state of at least one locking means assigned to the at least one door, for detecting the first and second time points.

5. The motor vehicle of claim 2, further comprising multiple of said at least one further sensor, wherein at least one of the multiple sensors is constructed as an optical detection device which optically detects an interior of the motor vehicle.

6. The motor vehicle of claim 1, further comprising seat occupation sensors operatively connected with the analysis unit for detecting a seat occupation in the motor vehicle.

7. The motor vehicle of claim 1, further comprising a memory unit for storing at least one of driving parameters and occupant related parameters, wherein the analysis unit is connected with the memory unit.

8. The motor vehicle of claim 7, wherein the driving parameters include a value for a dynamic load detected during a drive of the motor vehicle, and wherein the occupant related parameters include a value for the weight of the at least one occupant detected during the drive.

9. The motor vehicle of claim 1, wherein the analysis unit is connected with a control unit of a reversible or irreversible occupant protection means for controlling the occupant protection means as a function of the determined weight of the at least one occupant.

* * * * *